United States Patent [19]

Fast

[11] 3,947,360

[45] Mar. 30, 1976

[54] ENVIRONMENT PROTECTIVE OIL SKIMMING AND REMOVAL APPARATUS

[75] Inventor: Sven Gunnar Fast, Sandviken, Sweden

[73] Assignee: Sandco Limited, Ottawa, Canada

[22] Filed: Oct. 21, 1974

[21] Appl. No.: 516,763

Related U.S. Application Data

[63] Continuation of Ser. No. 391,554, Aug. 27, 1973, abandoned.

[52] U.S. Cl. ....... 210/242 S; 210/DIG. 25; 210/400; 210/526
[51] Int. Cl.² .......................................... E02B 15/04
[58] Field of Search ...... 210/83, 242, DIG. 21, 396, 210/400, 401, 196

[56] References Cited
UNITED STATES PATENTS

| | | |
|---|---|---|
| 2,929,507 | 3/1960 | Konline .............................. 210/400 |
| 3,314,540 | 4/1967 | Lane ................................... 210/242 |
| 3,537,584 | 11/1970 | MacDonald ........................ 210/196 |
| 3,670,896 | 6/1972 | Hale, Jr. et al. ..................... 210/242 |
| 3,700,108 | 10/1972 | Richards ............................ 210/242 |
| 3,744,257 | 7/1973 | Spanner ............................. 210/242 |
| 3,762,558 | 10/1973 | Anderson ........................... 210/242 |

*Primary Examiner*—Theodore A. Granger
*Attorney, Agent, or Firm*—Pierce, Scheffler & Parker

[57] ABSTRACT

The present invention relates to apparatus for collecting oil or other floating substances from a water surface, comprising a boat having a holding tank and at least one belt conveyor having its lower end submerged and its upper end in communication with the holding tank so that oil or other floating substances are removed from the water and conveyed to the holding tank as the boat progresses through the water.

3 Claims, 4 Drawing Figures

ENVIRONMENT PROTECTIVE OIL SKIMMING AND REMOVAL APPARATUS

This is a continuation of application Ser. No. 391,554 filed Aug. 27, 1973, now abandoned.

Although there has been much recent publicity with regard to the pollution and fouling of water and beaches by oil tanker shipwrecks, leakage from maritime oil wells and illegal oil dumping with the resultant necessity for clean up and removal of the oil to protect the environment including wildlife, the remedies have been quite unsatisfactory. Such measures as dumping straw into the water to absorb the oil and then raking the oil-laden straw from the water have been used, but this requires an unreasonable expenditure of labor. This problem is compounded in a harbor or other enclosed water area where large numbers of ships congregate and accidental or unintentional oil leakage presents a particularly serious problem.

Accordingly, it is an object of the present invention to provide an improved means for collecting oil or other floating substances from water by provision of a boat having at least one belt conveyor thereon adapted to remove oil or other floating substance from the water surface.

Further objects and advantages of the present invention will become readily apparent upon reading the following description which sets forth the invention in greater detail in connection with the accompanying drawings.

This invention, together with its features, objects and advantages can be better understood from the following detailed description when read in conjunction with the drawings in which.

Figure 1:
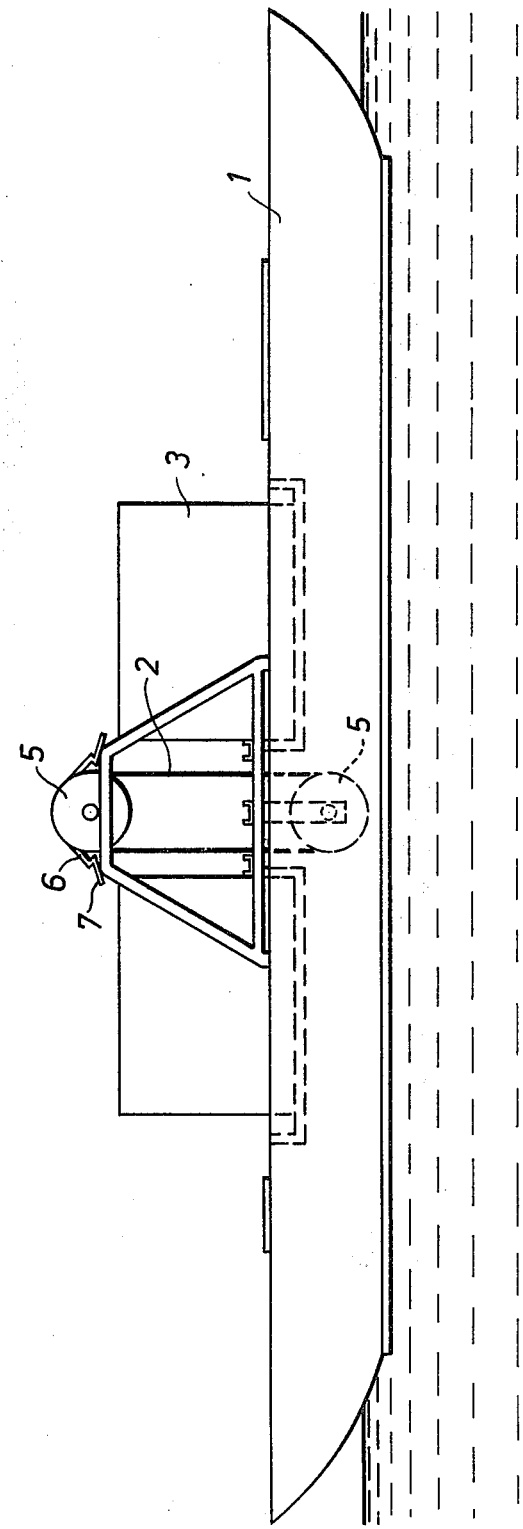
FIG. 1 is a side elevational view of a boat equipped with oil skimming means according to one embodiment of the invention.
Figure 2:
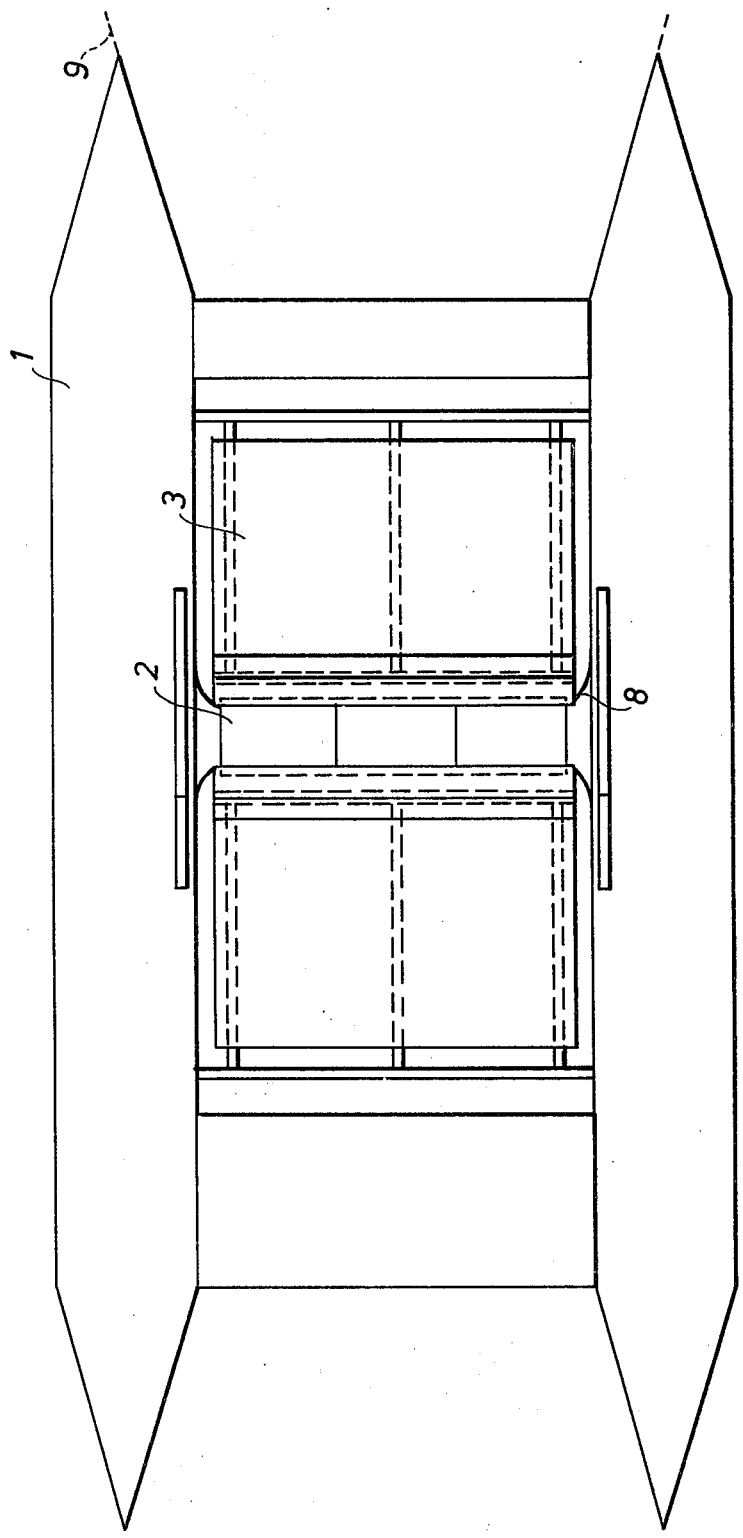
FIG. 2 is a plan view of the embodiment shown in FIG. 1.

In the embodiment of FIGS. 1 and 2, a boat 1 is provided with a conveyor system comprising one or more conveyor belts 2 riding on rollers 5, the lower end of conveyors being adapted to be lowered just below the surface of the water so that as the boat is driven through the water on which there is oil floating, the endless conveyor belts will collect the oil and bring it to the upper end of the conveyor where one of a pair of sets of scrapers 6,— the one depending on the direction of the movement of the conveyor belts,— contacts the conveyor belts to remove the oil therefrom. The scrapers 6 are provided with spouts 7 which direct the oil into holding tanks 3 located on either side of the conveyor. Tanks 3 are preferably interconnected by a pipe (not shown) so as to get uniform weight distribution on the boat at all times. The direction of movement of the conveyor belts is determined by the direction of motion of the boat and the motion of the belt is such that the portion facing forward is always travelling downward, the conveyor belt being selectively driven by an appropriate driving means (not shown). The principle of the oil skimming procedure is that the oil is much more adherent to the conveyor belts than the water so that while the oil is carried upward to scraper 6 and spout 7 and eventually to tanks 3, the water will flow back down.

Conveyors 2 are shown to be vertically disposed on boat 1. However, it is to be understood that they may be disposed slightly obliquely with respect to the boat. In that case, the conveyors are pivotally mounted upon the boat by means (not shown) so as to enable reversal of the inclination of the conveyors when driving the boat in the opposite direction so that the conveyors are inclined down forward of the boat's direction of motion.

As shown in FIG. 2, the boat 1 is formed as a catamaran with two parallel pontoons with the conveyors and tanks disposed between the pontoons, bands 8 of rubber or similar material may be arranged between each pontoon and the outer border of the endless belt to steer the oil film against the belt. Furthermore, the conveyor may be provided with heating means for facilitating the collection of coarse oil spills. Improved steering of the oil film to the endless belts may be provided by steering plates 9 (shown dotted) which may be secured to the pontoons. Conveyors 2 should be mounted substantially centrally of the boat.

The material used for the endless belts is preferably steel. It is to be understood that other suitable materials may be used. Of prime importance in the choice of the material is that the adhesivity of the oil to the material be much greater than that of the water so that an effective separation may be accomplished. By using steel as the belt material almost 100 percent oil collection is attainable.

It is further contemplated that the invention may be applied to a boat having a single hull. In this case, two belt conveyors are centrally disposed on both sides of the hull with holding tank 3 placed on the hull in between.

Figure 3:
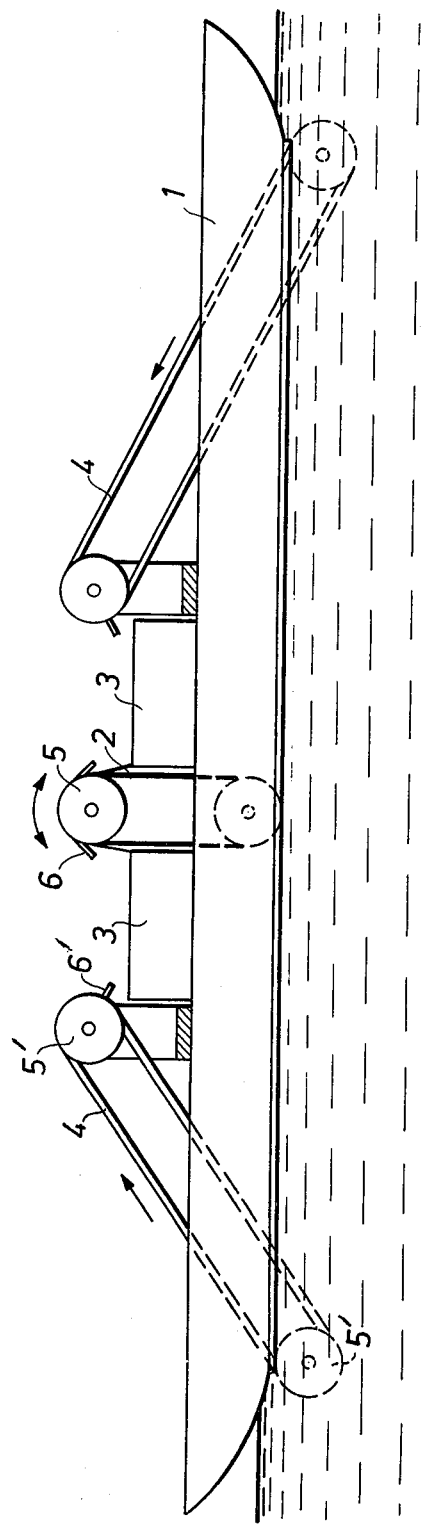
FIG. 3 is a side elevational view of a boat equipped with oil skimming means according to another embodiment of the invention.
Figure 4:
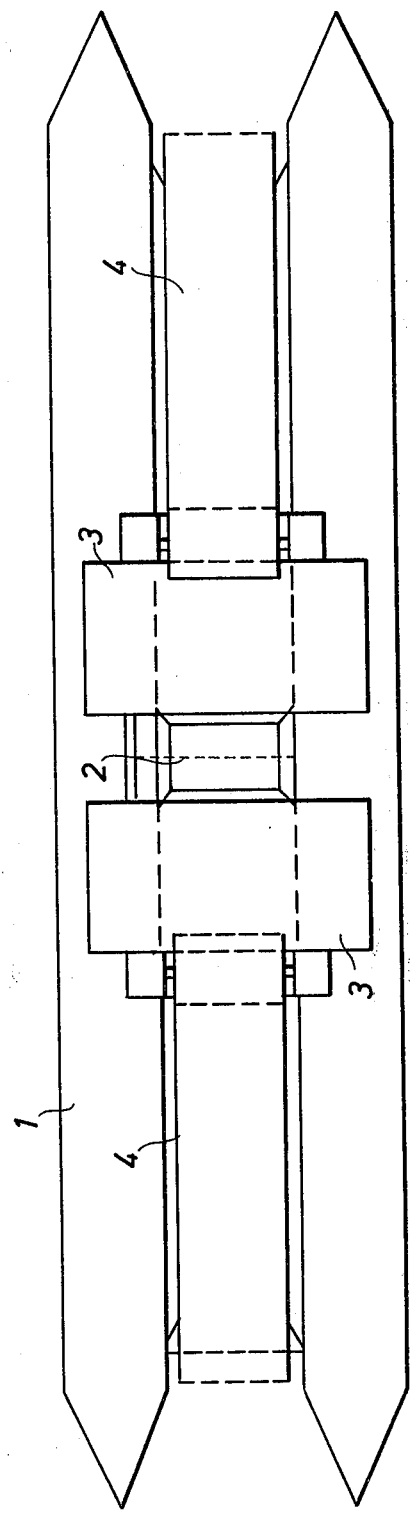
FIG. 4 is a plan view of the embodiment shown in FIG. 3.

Another aspect of the invention is shown in FIGS. 3 and 4, wherein boat 1, holding tanks 3, conveyor belts 2, rollers 5 and scrapers 6 are substantially similar to those shown in FIGS. 1 and 2. In this embodiment, the apparatus is additionally provided with a pair of auxiliary conveyors consisting of endless flexible perforated bands or belts 4 which are carried by rollers 5'. Each of these conveyors extends downwardly and obliquely towards its respective end of the boat with the lower rollers 5' sufficiently submerged below the surface of the water so that solids such as paper or cotton waste and coarse oil spills such as oil lumps will be engaged by and ride up on conveyor belt 4. Conveyor belts are driven in the directions indicated by arrows by driving means (not shown) so that one of these conveyors is always operative to convey waste from the water regardless of the direction in which the boat is travelling. At their upper ends, these auxiliary conveyors overhang the holding tanks 3 and scrapers 6' and are provided for discharging the collected material from belts 4 into the holding tanks. During the collection of coarse oil spills and solid material, water and thin oil on belt 4 will flow down through the perforations thereon and the thin oil will instead be collected by the centrally disposed, endless belts 2. This results in a simple and effective procedure for simultaneously collecting thin oil, coarse oil spills and solid material from a water surface.

As previously set forth, the centrally disposed conveyor comprises one or more endless, smooth and unperforated belts, preferably of hardened band steel, which has good adhesivity with respect to oil. The obliquely disposed conveyor belts 4, on the other hand comprise perforated belts, preferably of hardened band steel. Due to this arrangement, coarse oil spills of lump formed occurrence may be collected by its settling into the holes of the perforated belts with consequent good retention thereof during its transfer up to the discharge position above holding tank 3. The form of the holes of such perforated belt is preferably round but may obviously be varied to suit conditions. For example, the holes may be oval. A suitable diameter for round holes should be 3 to 4 mm.

In order to facilitate the collection of coarse oil spills from the water by means of conveyors 4 the lower running roller 5' thereof should at least in its entirety be positioned below the water surface, as shown in FIG. 3. Such arrangement also ensures that oil lumps which due to streaming are positioned at a usual distance of 3 to 4 dm below the water surface will be readily collected by the obliquely disposed perforated bands 4.

Although scraper means 6' are disposed at the upper ends of the perforated conveyors for discharging collected oil lumps and other substances therefrom, it may happen that some lumps have penetrated into the holes to such extent that a simple scraping action is not sufficient to remove them. For that purpose, pneumatic means (not shown) may be disposed on the underside of the perforated belt to remove such adherent substances.

Experiments carried out with the apparatus of the present invention have shown that the perforated belt conveyors 4 should be obliquely disposed at an angle of 20° to 30° with respect to the water in which the boat is situated.

There are significant advantages to the apparatus of the present invention. By disposing conveyors centrally on a boat as seen in its longitudinal extension, it is possible to minimize the disturbing influence thereon due to sea leverage, especially in somewhat rougher water, that otherwise should act on the conveyor so as to lift the belt thereof up from the water surface. The best properties in this aspect are inherent in the catamaran, where the centrally disposed conveyor is placed at the middle of the boat as seen in its transverse extension where the sea leverage has the smallest effect. Another essential advantage is that the present apparatus enables collection of oil when driving the boat in two opposite directions without the necessity of turning the boat.

While the present invention has been described with reference to a particular embodiment, it is not of course limited thereto. Thus the invention is also applicable to pneumatic boats where it may be advantageous for rapidly cleaning up oil spills in skerries. Further, other boat or barges are useful with the invention, for example boats comprising more than two parallel pontoons.

I claim:

1. Oil skimming apparatus, for collecting oil and other floating substances from the surface of a body of water, comprising:
a catamaran-type boat having spaced-apart hulls, said boat being provided with drive means;
at least one holder tank amidships on said boat;
at least one litter conveyor disposed between said holder tank and the bow of the boat and between said pontoons, said litter conveyor comprising a perforate endless band disposed obliquely to and with its forward end dipping beneath the surface of the water, and means for driving said endless band in such direction that the upper flight thereof travels in the direction opposite to that of said boat thereby to collect coarse oil spills and litter from the water in travel of said boat, the upper end of said obliquely disposed litter conveyor overlying said holder tank; and
a substantially vertically disposed belt conveyor positioned between said hulls to the rear of said boat, said belt conveyor comprising upper and lower end rollers and an endless imperforate belt having a smooth surface made of a material to which oil adherence is much greater than that of water, said lower roller being partially immersed in the water for effecting such oil adherence on said endless belt;
means connected to said endless belt for continuously driving said belt to enable oil pick-up in boat travel;
wiping means for transference of oil from said endless belt to said holder tank,
the belt of said substantially vertically disposed conveyor being adapted to skim thin oil from the water surface,
whereby coarse oil spills, litter and thin oil are simultaneously removed from the water.

2. Oil skimming apparatus for collecting oil or similar floating substances from a water surface comprising:
a catamaran-type boat having spaced-apart hulls, said boat being provided with drive means so as to enable boat travel in either of two opposed directions;
a belt conveyor positioned between said hulls comprising an endless belt having a smooth surface made of a material to which oil adherence is much greater than that of water, the lower roller of said belt being partially immersed in the water for effecting said oil adherence,
said belt conveyor being substantially vertically disposed at the middle of the boat as seen in the longitudinal extension thereof;
means connected to said belt for continuously driving said belt in either of two opposed directions so as to enable oil pick-up in both said directions of boat travel;
at least one holder tank on said boat;
wiping means for transference of oil from said belt to said holder tank; and
additional conveyors symmetrically arranged on both sides of said centrally disposed conveyor, said additional conveyors being disposed between said pontoons and comprising perforate endless bands disposed obliquely to the surface of the water and driven in such directions that the surfaces of said perforate endless bands facing the respective ends of said boat are both travelling upward from the water surface to collect coarse oil spills and litter from the water in either direction of travel of said boat, said centrally disposed conveyor comprising imperforate endless bands adapted to skim thin oil from the water surface, whereby coarse oil spills, litter and thin oil are simultaneously removed from the water.

3. Oil skimming apparatus according to claim 2, wherein said additional conveyors are disposed obliquely on said boat at an inclination of from 20° to 30° to the surface of the water.

* * * * *